C. A. HENNICKE.
EXTENSION BRACKET FOR PLATFORM BOLSTERS OF MOTOR TRUCKS.
APPLICATION FILED JUNE 17, 1919.
1,363,785.
Patented Dec. 28, 1920.
2 SHEETS—SHEET 1.
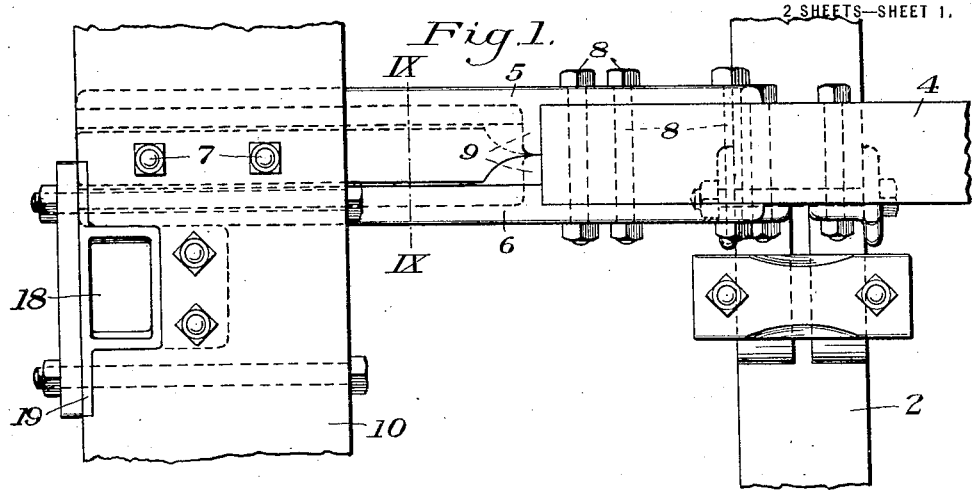
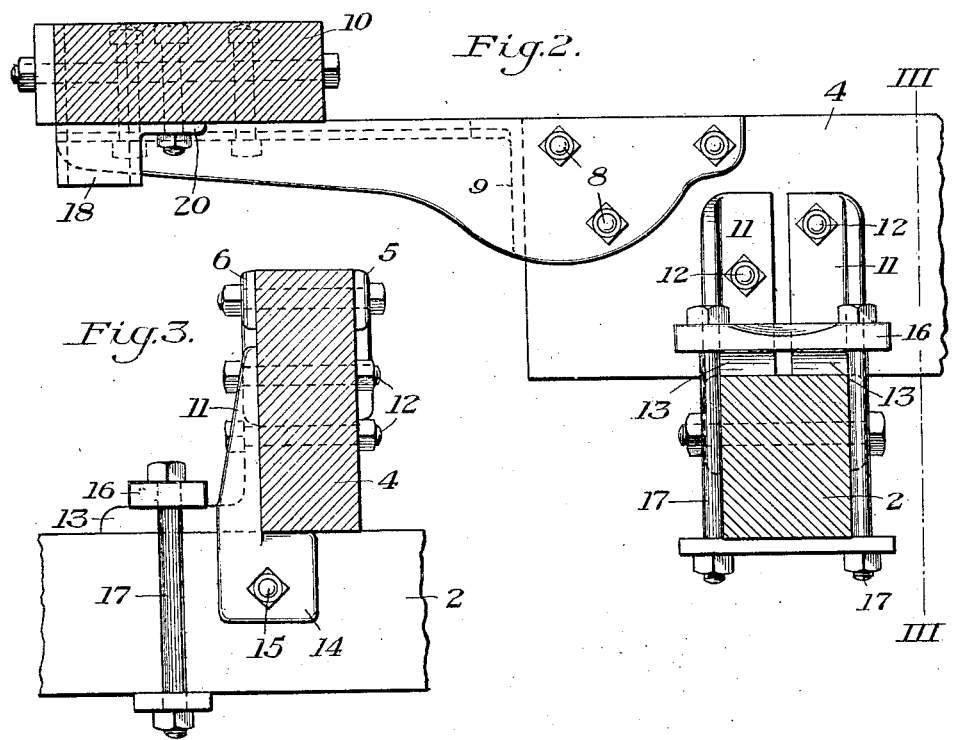
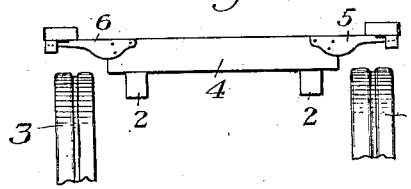
WITNESSES
INVENTOR
C. A. Hennicke C. A. HENNICKE.
EXTENSION BRACKET FOR PLATFORM BOLSTERS OF MOTOR TRUCKS.
APPLICATION FILED JUNE 17, 1919.
1,363,785.
Patented Dec. 28, 1920.
2 SHEETS—SHEET 2.
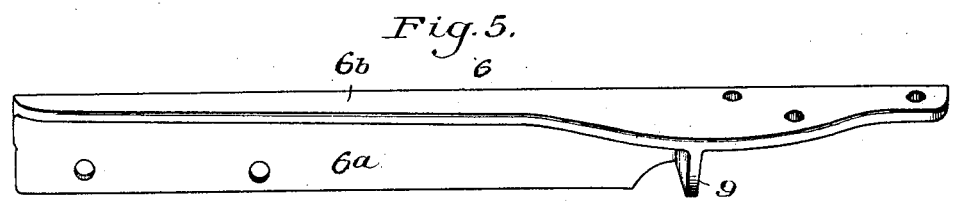
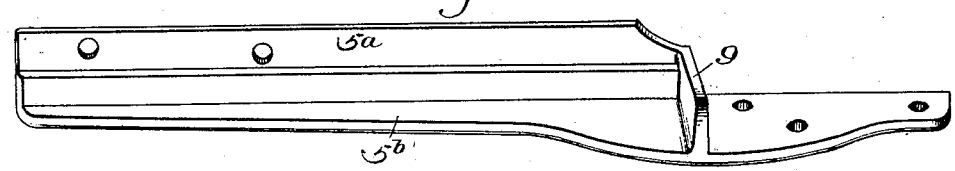
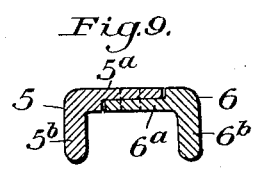
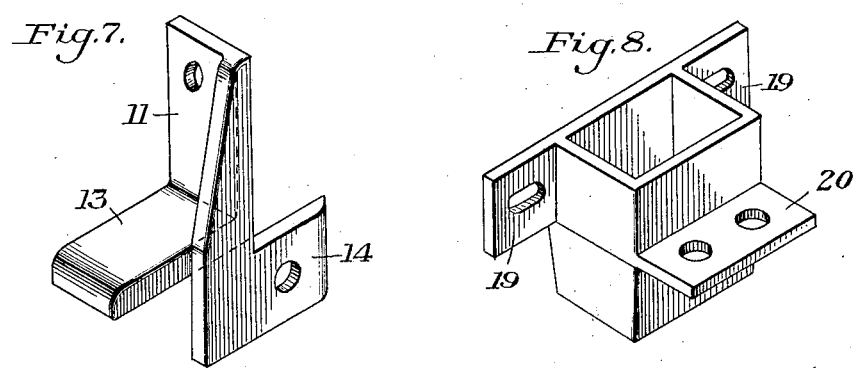
WITNESSES
INVENTOR

UNITED STATES PATENT OFFICE.

CHARLES A. HENNICKE, OF CLEVELAND, OHIO.

EXTENSION-BRACKET FOR PLATFORM-BOLSTERS OF MOTOR-TRUCKS.

1,363,785.　　　　　Specification of Letters Patent.　　Patented Dec. 28, 1920.

Application filed June 17, 1919. Serial No. 304,880.

*To all whom it may concern:*

Be it known that I, CHARLES A. HENNICKE, a resident of Cleveland, Cuyahoga county, Ohio, have invented a new and useful Improvement in Extension-Brackets for Platform - Bolsters of Motor - Trucks, of which the following is a full, clear, and exact description, reference being had to the accompanying drawings, forming part of this specification, in which—

Figure 1 is a plan view partly broken away showing an extension bracket device embodying my invention;

Fig. 2 is a view partly in elevation and partly in vertical section of the parts shown in Fig. 1;

Fig. 3 is a section on the line III—III of Fig. 2;

Fig. 4 is a rear elevation partly diagrammatic illustrating the application of my invention to a motor truck;

Figs. 5 and 6 are views showing in detail the members of the extension bracket, the members being in this form turned substantially ninety degrees from the position in which they are shown in Fig. 2;

Fig. 7 is a perspective view of one of the corner braces and clip bearings;

Fig. 8 is a perspective view of the stake pocket; and

Fig. 9 is a section on the line IX—IX of Fig. 1.

My invention has relation to bolster extension brackets and fastening braces for securing the same to an auto truck chassis.

In the construction of the bodies and stake platforms commonly used on motor chassis, it frequently becomes necessary to place a short bolster or cross member directly between the rear driving wheels of the truck, in order to properly support the body or platform resting on the cross members. In such case, the body is not properly supported directly over the rear wheels, because of the fact that it is necessary to shorten the bolster to clear the wheels.

The object of my invention is to provide a simple and strong device in the nature of a bracket extension for the cross bolster which will form a support for the body directly over the rear wheels. Also to provide a simple and convenient means for securely fastening the short cross bolster to the longitudinal sills of the chassis frame.

The nature of my invention will be best understood by reference to the accompanying drawings, in which I have illustrated the preferred embodiment thereof and which will now be described, it being premised, however, that various changes can be made in the details of construction and arrangement of the various parts without departing from the spirit and scope of my invention as defined in the appended claim.

In these drawings, 2 designates the longitudinal side frames or sills of the chassis, 3 the rear truck wheels, and 4 a short cross bolster mounted between the rear wheels. 5 and 6 designate bracket extension members, one pair of which is secured to each end portion of the cross bolster 4. Each of these bracket members has a horizontal flange portion $5^a$ or $6^a$, these two portions being arranged to overlap each other in the manner best shown in Fig. 9 and to be secured by bolts 7.

Each of said members is also provided with a depending flange $5^b$ or $6^b$, which is extended at its inner end to engage a side face of the end portion of the cross bolster, and is provided with bolt holes to receive the bolts 8. Each bracket member is also formed with a transverse rib or flange 9, which bears against the end of the bolster, this forming a solid and strain-resisting bearing for the bracket members. These bracket members, as will readily appear, extend from each end of the cross bolster and form a desirable support for the body or platform, the body sills of which are shown at 10, directly over the rear wheels, thereby making a strong and compact construction.

In order to firmly secure the cross bolster to the side sills, I provide connecting devices which will now be described.

Each of these devices comprises a pair of angle braces, each of which has a vertically extending arm 11, for attachment to the cross bolster by any suitable means, such as a bolt 12, and the horizontally extending portion 13, which bears on the upper surface of the side sill 2. Each of these braces is also provided with a depending rearwardly projecting flange 14, provided with an aperture to receive a bolt 15, this flange extending downwardly at the inner side of the side sill and being bolted thereto. The portions 13 form a bearing for a clip or tie plate 16, extending across them and having the tie bolts 17, which pass downwardly at the sides of the side sill. These devices form simple and convenient means for rigidly fastening the short cross bolster to the side sill. The braces are made in pairs in order to enable them to be readily adjusted to variations in the thickness of the sill members.

The numeral 18 designates one of the stake pockets which is set in the body sill 10, any suitable number of these stake pockets being provided in each of these sills which extend the full length of the body. These pockets are provided with the bolting lugs 19, by which they can be bolted to the outer side face of the body sill 10, and also preferably with the inwardly extending bolting flange 20, to receive bolts extending downwardly into the side sill.

The advantages of my invention can be readily understood by those familiar with the desirability of providing means of simple, strong and serviceable character to afford a proper bearing for the body or platform of a motor truck directly over the rear wheels.

I claim:

A bolster extension device for trucks, consisting in the combination with a cross bolster, of a pair of flanged bracket members at each end provided with suitable bearings for bolting to and resting against the end of the bolster and extending outwardly over the wheel of the truck, said members having means for securing thereto the sill or outer frame member of the truck body or platform, said bracket members having overlapping horizontal flanges provided with means whereby said body sill or platform member may be attached thereto, substantially as described.

In testimony whereof, I have hereunto set my hand.

CHARLES A. HENNICKE.